Patented Aug. 7, 1934

1,968,878

UNITED STATES PATENT OFFICE 1,968,878

DYEING INTERMEDIATE AND PROCESS FOR ITS PRODUCTION

Miles Augustinus Dahlen, Wilmington, and Frithjof Zwilgmeyer, Gordon Heights, Del., assignors to E. I. du Pont de Nemours & Company, Wilmington, Del., a corporation of Delaware No Drawing. Application December 3, 1932, Serial No. 645,584

18 Claims. (Cl. 260—69)

This invention relates to new water and/or alkali soluble diazoimino suitable for use in dyeing and printing processes, and methods for their preparation. More particularly it refers to compounds of the following general formula:

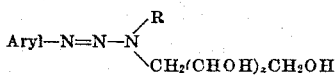

in which aryl represents an aromatic nucleus containing no water solubilizing group but which may have substituted thereon non-water solubilizing groups, R represents an alkyl, aralkyl or completely reduced carbocyclic radical, and $x$ represents one of the integers—2—3—4.

It is an object of this invention to produce new compounds which may be used in dyeing and printing processes where beautiful colors of exceptional stability are desired. A further object is to overcome many of the difficulties formerly inherent in the prior art. Additional objects will appear hereinafter.

These objects are accomplished by the present invention wherein diazo salts of the following general formula:

$$Aryl—N_2X$$

are coupled with secondary sugar amines having the following structure:

$$R—NH—CH_2(CHOH)_xCH_2OH$$

to produce diazoimino compounds having the previously mentioned general formula. In the aforementioned general formulas X represents an acid radical, and the remaining terms have the same definition as heretofore.

The invention will be more completely understood by reference to the following illustrative examples in which the quantities are stated in parts by weight.

*Example 1*

12.75 parts of meta-chloro-aniline were stirred with 40 parts of hydrochloric acid of 25% strength until the base was converted completely to the hydrochloride. Ice was then added to bring the temperature to 0–5° C., and the base diazotized by the addition of a solution of 6.9 parts of sodium nitrite dissolved in 25 parts of water, holding the temperature at 0–5° C. by the addition of ice as required. When diazotization was complete, the solution was filtered to remove very small quantities of insoluble matter. 21.5 parts of methylglucamine of the formula:

$$CH_3NHCH_2(CHOH)_4CH_2OH$$

were then added, followed by the addition of enough sodium carbonate solution of 15% strength to make the mass slightly alkaline to brilliant yellow papers. Immediate coupling with the disappearance of the free diazo-salt occurred, resulting in the formation in solution of the diazoimino compound of the following probable structure:

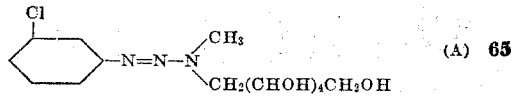 (A)

Sufficient salt was then added to the solution to precipitate the product. It was filtered, washed substantially free from inorganic salts by stirring for a few minutes with ice water and refiltering, and was then dried. Approximately 31 parts of the material were obtained.

The new diazoimino compound (A) is a very light colored solid which is very slightly soluble in ice water, moderately soluble in water at ordinary temperatures, and very soluble in hot water. It may be purified, if desired, by crystallization from water, ethyl alcohol, or other suitable solvent. The product is very stable toward the action of alkalies or of cold dilute acids. However, it is readily hydrolyzed to the diazo-salt and methyl-glucamine by strong mineral acids or by hot dilute solutions of weak acids such as acetic or formic acid.

*Example 2*

A diazo solution was prepared from 12.7 parts of meta-chloro-aniline as described in Example 1. To this solution was then added 23 parts of ethyl-glucamine, followed by sufficient sodium carbonate to render the mass slightly alkaline. Approximately 34 parts of the new diazoimino compound of the probable formula:

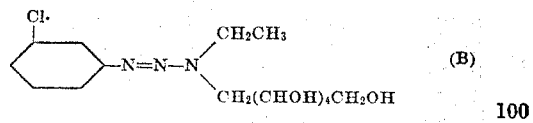 (B)

were obtained, the product being isolated by substantially the same method described in Example 1.

The new diazoimino compound (B) showed properties similar to those of the product obtained in the previous example.

*Example 3*

The process of Examples 1 and 2 was repeated, substituting 22 parts of methyl-galactamine for the methyl- and ethyl-glucamines used above. A new diazoimino compound of the probable formula:

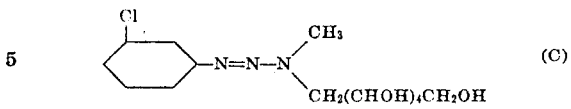

was obtained in a yield of about 30.5 parts. It will be noted that (A) and (C) are similar in formula, but are actually stereoisomers. The properties of (C) are similar to those of the products obtained in the previous examples.

*Example 4*

The process of the above examples was repeated, using 18.2 parts of methyl-xylamine for the formation of the diazoimino compound. In this case, the product was very soluble in water and was therefore isolated by evaporating the completed reaction mass to dryness under reduced pressure, preferably at a temperature of 40–50° C. The crude product thus obtained was dissolved in ethyl alcohol, the solution filtered from insoluble inorganic salts, and again evaporated to dryness. About 31.5 parts of the new diazoimino compound of the probable formula:

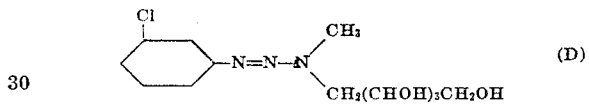

were obtained. Its properties were similar to those of (A), (B) and (C) obtained in previous examples.

*Example 5*

14.2 parts of para-chloro-ortho-toluidine (4-chloro-2-amino-toluene) were stirred with 40 parts of hydrochloric acid of about 25% strength until the base was converted to the hydrochloride. Ice was then added to adjust the temperature to 0–5° C., followed by a solution of 6.9 parts of sodium nitrite dissolved in 25 parts of water. Ice was added during the diazotization process in the quantity required to maintain a temperature of 0–5° C. When diazotization was complete, the diazo solution was filtered from insoluble matter. 21.5 parts of methyl-glucamine were added, followed by the quantity of sodium carbonate (in the form of a 10% aqueous solution) necessary to make the mass slightly alkaline to brilliant yellow papers. When the formation of diazoimino compound was complete, as shown by the absence of free diazo-salt, sodium chloride was added to precipitate the new product of the probable formula:

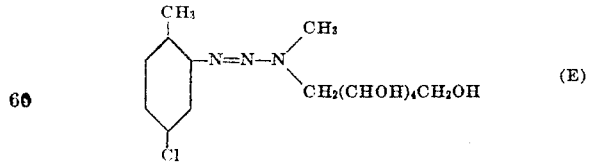

The material was filtered, stirred for a short time with ice water to dissolve inorganic salts, again filtered, and dried at ordinary temperature. Approximately 32 parts of the product (E) were obtained.

The new diazoimino compound (E) showed the properties of water solubility, stability toward alkalies and cold dilute acids, and reversion to the diazo-salt and methyl-glucamine under the influence of hot solutions of weak acids, characteristic of the new products obtained in the previous examples.

*Example 6*

A diazo solution was prepared from 14.2 parts of para-chloro-ortho-toluidine as described in Example 5. To this was added 29.0 parts of cyclohexyl-glucamine, followed by the required quantity of sodium carbonate solution. The product was isolated by evaporating the finished reaction mass to dryness, extraction with alcohol and evaporation of the alcoholic extract. About 42.5 parts of the new diazoimino compound of the probable structure:

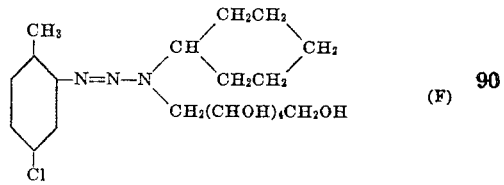

were obtained. This product showed properties similar to those of the materials produced in the previous examples.

*Example 7*

15.8 parts of 4-chloro-2-amino-anisole (para-chloro-ortho-anisidine) were stirred with 40 parts of hydrochloric acid of about 25% strength, the mass being heated to effect complete solution. Ice was then added to bring the temperature to 5–10° C. The base was now diazotized by the addition of an aqueous solution of 6.9 parts of sodium nitrite, ice being also added in the quantity required to maintain the above temperature. When diazotization was complete, the solution was filtered to remove insoluble impurities; and 21.5 parts of methyl-glucamine were added followed by enough sodium carbonate solution to make the reaction mass alkaline. The product was isolated by "salting" and was freed from inorganic impurities by slurrying with ice-water, as in previous examples. About 33.5 parts of the new diazoimino compound of the probable structure:

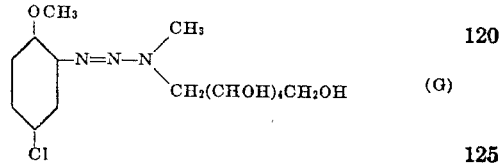

were obtained. The new product showed properties similar to those of the materials described in previous examples.

*Example 8*

A diazo solution was prepared from 15.8 parts of para-chloro-ortho-anisidine by the method described in the previous example. To this solution was added 26.3 parts of butyl-xylamine, followed by the sodium carbonate necessary to produce an alkaline reaction. The mass was evaporated to dryness, the product extracted with alcohol and recovered by evaporation of the alcoholic extract. About 40.5 parts of the new diazoimino compound of the following probable formula were obtained:

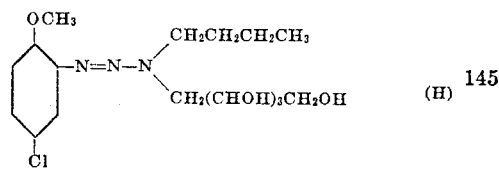

The new diazoimino compound (H) showed properties similar to those of the products of previous examples.

Example 9

Example 8 was repeated, substituting 28 parts of amyl-glucamine (obtained by the hydrogenation of a solution of mixed amyl-amines and glucose) for the butyl-xylamine. About 42.5 parts of a new diazoimino compound of the following probable structure were obtained:

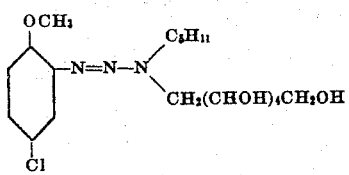

Example 10

17 parts of 5-nitro-2-amino-anisole (5-nitro-ortho-anisidine) were dissolved in about 40 parts of 25% hydrochloric acid and diazotized at 0–10° C. by the addition of a solution of 6.9 parts of sodium nitrite in 25 parts of water. To the filtered diazo solution was added 21.5 parts of methyl-glucamine, followed by the quantity of sodium carbonate necessary to neutralize all free acidity. About 34 parts of the new diazoimino compound (J) of the following probable formula:

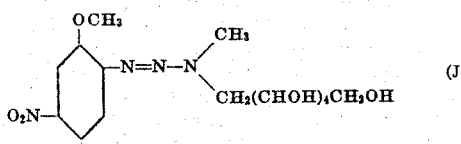

were obtained. Its properties were similar to those of the diazoimino compound described in earlier examples.

Example 11

Example 10 was repeated, substituting 30.5 parts of benzyl-glucamine for the methyl-glucamine. About 45 parts of the diazoimino compound of the probable formula:

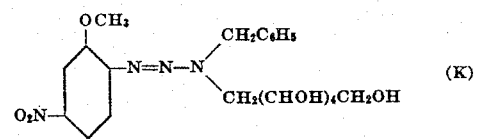

were obtained. Except for a somewhat lower solubility in water (due to the presence of the "heavy" benzyl group), this product showed properties similar to those of the materials obtained in the previous examples.

It is, of course, clear that the compounds used in the above examples are merely a few selected from the large number of compounds which may be used in carrying out the process of the present invention. For example, in place of the sugar amines mentioned, sugar amines prepared from any of the well-known sugars might be used. Among these sugars are the various tetroses, pentoses and hexoses such as, erythrose, arabinose, xylose, glucose, mannose, and galactose.

The different optical modifications of the aldoses, namely, the dextro-, laevo-, meso-, and racemic modifications may be used in preparing the secondary sugar amines. Mixtures of these aldoses with alkyl amines, aralkyl amines or completely reduced cyclic amines may be reduced to produce the secondary sugar amines previously referred to. Various reduction processes may be utilized to produce these sugar amines, one of such processes being the liquid phase catalytic hydrogenation of a mixture of an aldose and a primary amine. The primary amines used in this reaction may be selected from a large number of alkyl, aralkyl and completely reduced cyclic amines. Representative amines selected from the groups mentioned are methyl-, ethyl-, N- and isopropyl-, N-, iso-, secondary- and tertiary butyl-, and amyl amine, in the case of the alkyl amines. In the case of the aralkyl amines examples are benzyl-, phenyl-ethyl-, and alpha-naphthyl-methyl-amine. For the cyclic amines, reference may be made to cyclo-pentyl-, cyclo-hexyl- and meta-methyl-cyclo-hexyl-amine. It is also to be understood that the sugar amines may be prepared by non-reduction processes without departing from the scope of the present invention.

In choosing the amines to be diazotized and coupled with the above mentioned sugar amines, the selection may be made from the group commonly referred to as "ice color" bases. Typical examples of these well-known "ice color" bases are as follows:

2:5-dichloro-aniline
5-nitro-2-amino-toluene
4-amino-6-benzoylamino-meta-xylene
N-(para-amino-benzoyl)-para-toluidine
1-amino-anthraquinone
Ortho-phenetidine-azo-cresidine
4,4'-diamino-diphenylamine
Alpha-naphthylamine
4-amino-azobenzene
5-chloro-2-amino-toluene
4-chloro-2-nitro-aniline
3-amino-carbazole
Tolidine
1-amino-4-benzoylamino-2,5-diethoxy-benzene
Ortho-chloro-aniline
2-amino-4-chloro-5-nitro-anisole Although almost any of the aromatic amines containing no water solubilizing groups may be used, the most satisfactory results are obtained by selecting amines from the benzene, diphenyl, diphenylamine, naphthalene, azobenzene, anthraquinone and carbazole series. These amines should contain no water solubilizing groups such as, sulfonic acid or carboxylic acid groups. However, they may have substituted thereon groups such as halogen, alkyl, alkoxy, nitro and benzoylamino.

Coupling of the diazotized ice color base with the sugar amine is advantageously carried out in the presence of an acid binding reagent such as, sodium carbonate, sodium acetate or sodium bicarbonate. In some cases this coupling will be carried out with best results under alkaline conditions, in others, neutral conditions may be most suitable, and in a few instances, acid conditions are desirable. One skilled in the art will have no difficulty in selecting the proper conditions under which to carry out the coupling.

The diazoimino compounds produced as a result of the coupling of the diazotized ice color base with the sugar amine may be isolated by numerous well-known methods, depending upon the characteristics of the individual compound produced. Where the compound is very soluble, isolation may advantageously be effected by evaporating the reaction mass to dryness. In the case of a less soluble compound, isolation may be effected by the addition of salting agents, such as sodium chloride, to the finished reaction mass. The isolated compounds are usually solid crystalline substances which may be purified by crystallization from suitable solvents. They are quite stable and may be dried at moderate temperatures.

The new diazoimino compounds are appreciably soluble in water and have a good stability towards alkalies which makes them especially desirable for use in dyeing and printing processes. These compounds are hydrolyzed by the action of acids, resulting in the production of the diazo salt and the secondary sugar amine. At ordinary temperatures, this reaction proceeds quite rapidly in the presence of strong mineral acids. Where weaker acids, particularly dilute solutions of these acids are used, the reaction proceeds very slowly at ordinary temperatures. However, if the temperature is increased the rate of hydrolysis increases appreciably. For example, hydrolysis with a 5% acetic acid solution, in the cold, is extremely slow, but at the boiling point hydrolysis is usually complete within a very short time. Of course, the ease of hydrolysis depends to a great extent upon the composition of the particular compound, in some cases taking place quite rapidly while in other cases a longer time is required. In general, all of the compounds are appreciably soluble in water but here again, as is to be expected, the degree of solubility depends upon the structure of the compound.

The compounds described herein may be utilized in dyeing and printing processes according to the methods described in a copending application. Briefly, these methods comprise hydrolyzing the diazoimino compound by treatment with a weak acid at elevated temperatures in such manner that the regenerated diazo salt immediately couples with an ice color coupling component which is present in the reaction mass.

The products of the present invention are appreciably soluble in water, hydrolyze readily, and react with ice color coupling components to form colors of exceptional stability and uniformity. The reaction is carried out with a minimum of effort, in many instances a "one step" process being sufficient. The solubility of the compounds permits better penetration of the material to be colored, and consequently results in the production of a more satisfactory product than could formerly be obtained. The secondary sugar amine, regenerated by hydrolysis of the diazoimino compound, has a very low reducing power so that there is practically no reduction of the diazo salt, with the resultant disadvantage due to loss in coloring power of the ice color produced, as well as failure to utilize all of the diazo salt available. The cheapness of the aldoses and amines, and consequently of the sugar amines, used in carrying out the process of the present invention, also commend this invention from a commercial standpoint.

As many apparently widely different embodiments of this invention may be made without departing from the spirit and scope thereof, it is to be understood that we do not limit ourselves to the specific embodiments thereof except as defined in the appended claims.

We claim:

1. A process for producing diazoimino compounds which comprises coupling a secondary sugar amine with a diazotized aromatic amine containing no water solubilizing group.

2. A process for producing diazoimino compounds which comprises coupling a diazotized aromatic amine derived from a water insoluble aromatic amine with a secondary sugar amine having the general formula:

$$R-NH-CH_2(CHOH)_xCH_2OH$$

wherein R represents an alkyl, aralkyl, or completely reduced carbocyclic radical, and $x$ represents one of the integers —2—, —3—, or —4—.

3. A process for producing diazoimino compounds which comprises coupling a secondary sugar amine having the general formula:

$$R-NH-CH_2(CHOH)_xCH_2OH$$

wherein R represents an alkyl, aralkyl, or completely reduced carbocyclic radical, and $x$ represents one of the integers —2—, —3—, or —4—, with a diazotized aromatic amine having the following general formula:

$$Aryl-N_2X$$

wherein aryl represents the residue of an arylamine of the benzene, diphenyl, diphenylamine, naphthalene, azobenzene, anthraquinone, or carbazole series, derived from water insoluble aromatic amines of the aforementioned series.

4. A process for producing diazoimino compounds which comprises coupling a secondary sugar amine having the following general formula:

$$R-NH-CH_2(CHOH)_xCH_2OH$$

wherein R represents an alkyl group, and $x$ represents one of the integers —2—, —3—, or —4—, with a diazotized aromatic amine having the following general formula:

$$Aryl-N_2-X$$

wherein aryl represents the residue of an arylamine of the benzene series, which may have substitued thereon members selected from the class consisting of halogen, alkyl, alkoxy, nitro and benzoylamino groups, and X represents an acid radical.

5. A process for producing diazoimino compounds which comprises coupling a secondary sugar amine having the general formula:

$$R-NH-CH_2(CHOH)_xCH_2OH$$

wherein R represents an alkyl, aralkyl, or completely reduced carbocyclic radical, and $x$ represents one of the integers —2— 3—4, with a diazotized aromatic amine having the following general formula:

$$Aryl-N_2-X$$

wherein aryl represents the residue of an arylamine of the benzene, diphenyl, diphenyl-amine, naphthalene, azobenzene, anthraquinone, or carbazole series, which contains no water-solubilizing group but which may have substituted thereon members selected from the group consisting of halogen, alkyl, alkoxy, nitro and benzoylamino, and X represents an acid radical.

6. A process for producing diazoimino compounds which comprises coupling a secondary sugar amine having the general formula:

$$R-NH-CH_2(CHOH)_xCH_2OH$$

wherein R represents an alkyl, aralkyl, or completely reduced carbocyclic radical, and X represents one of the integers —2—, —3— or —4—, with a diazotized aromatic amine having the following general formula:

$$Aryl-N_2X$$

wherein aryl represents the residue of an arylamine of the benzene or naphthalene series, derived from water insoluble aromatic amines of the aforementioned series, and X represents an acid radical.

7. A process for producing diazoimino compounds which comprises coupling methyl-glucamine with diazotized meta-chloro-aniline.

8. A process for producing diazoimino compounds which comprises coupling methyl-glucamine with diazotized para-chloro-ortho-toluidine.

9. A process for producing diazoimino compounds which comprises coupling methyl-glucamine with diazotized para-chloro-ortho-anisidine.

10. Diazoimino compounds having the following general formula:

Aryl—N=N—Z wherein aryl represents the residue of an aromatic amine containing no water-solubilizing group, and Z represents the residue of a secondary sugar amine.

11. Diazoimino compounds having the following general formula:

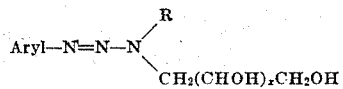

wherein aryl represents an aromatic nucleus derived from a water insoluble aromatic amine, R represents an alkyl, aralkyl, or completely reduced carbocyclic radical, and $x$ represents one of the integers —2—3—4.

12. Diazoimino compounds having the following general formula:

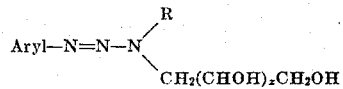

wherein aryl represents the residue of an arylamine of the benzene, diphenyl, diphenylamine, naphthalene, azobenzene, anthraquinone, or carbazole series, derived from water insoluble aromatic amines of the aforementioned series, and R represents an alkyl, aralkyl, or completely reduced carbocyclic radical, and $x$ represents one of the integers —2—, —3—, or —4—.

13. Diazoimino compounds having the following general formula:

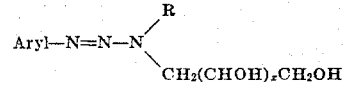

wherein aryl represents the residue of an arylamine of the benzene series which may have substituted thereon members selected from the class consisting of halogen, alkyl, alkoxy, nitro and benzoylamino groups, R represents an alkyl group, and $x$ represents one of the integers —2—, —3—, or —4—.

14. Diazoimino compounds having the following general formula:

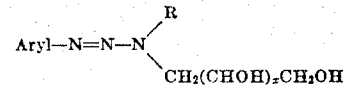

wherein aryl represents the residue of an arylamine of the benzene, diphenyl, diphenyl-amine, naphthalene, azobenzene, anthraquinone, or carbazole series, which contains no water-solubilizing group but which may have substituted thereon members selected from the group consisting of halogen, alkyl, alkoxy, nitro and benzoylamino, and R represents an alkyl, aralkyl, or completely reduced carbocyclic radical, and $x$ represents one of the integers —2—3—4.

15. Diazoimino compounds having the following general formula:

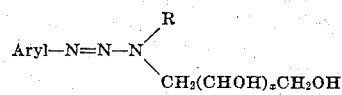

wherein aryl represents the residue of an arylamine of the benzene or naphthalene series, derived from water insoluble aromatic amines of the aforementioned series, R represents an alkyl, aralkyl, or completely reduced carbocyclic radical, and $x$ represents one of the integers —2—, —3—, or —4—.

16. A diazoimino compound having the following formula:

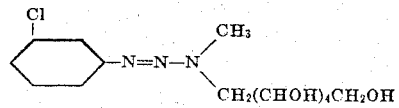

which is a light colored solid, very slightly soluble in ice water, moderately soluble in water at ordinary temperatures, and very soluble in hot water.

17. A diazoimino compound having the following formula:

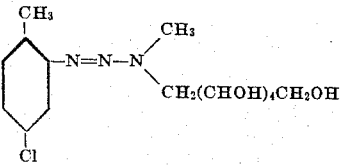

which is a light colored solid, very slightly soluble in ice water, moderately soluble in water at ordinary temperatures, and very soluble in hot water.

18. A diazoimino compound having the following formula:

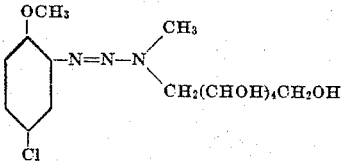

which is a light colored solid, very slightly soluble in ice water, moderately soluble in water at ordinary temperatures, and very soluble in hot water.

MILES AUGUSTINUS DAHLEN.
FRITHJOF ZWILGMEYER.

CERTIFICATE OF CORRECTION.

Patent No. 1,968,878.  August 7, 1934.

MILES AUGUSTINUS DAHLEN, ET AL.

It is hereby certified that error appears in the printed specification of the above numbered patent requiring correction as follows: Page 1, line 2, after "diazoimino" insert the word compounds; and that the said Letters Patent should be read with this correction therein that the same may conform to the record of the case in the Patent Office.

Signed and sealed this 25th day of September, A. D. 1934.

Leslie Frazer (Seal)  Acting Commissioner of Patents.